United States Patent
Taiana

(10) Patent No.: US 10,479,620 B2
(45) Date of Patent: Nov. 19, 2019

(54) DESTACKING DEVICE AND METHOD FOR DESTACKING METAL SHEETS

(71) Applicant: Soudronic AG, Bergdietikon (CH)

(72) Inventor: Peter Taiana, Neuenhof (CH)

(73) Assignee: SOUDRONIC AG, Bergdietikon (CH)

( * ) Notice: Subject to any disclaimer, the term of this patent is extended or adjusted under 35 U.S.C. 154(b) by 652 days.

(21) Appl. No.: 14/652,691

(22) PCT Filed: Nov. 29, 2013

(86) PCT No.: PCT/CH2013/000205
§ 371 (c)(1),
(2) Date: Sep. 3, 2015

(87) PCT Pub. No.: WO2014/094184
PCT Pub. Date: Jun. 26, 2014

(65) Prior Publication Data
US 2015/0360883 A1    Dec. 17, 2015

(30) Foreign Application Priority Data

Dec. 17, 2012  (CH) ...................................... 2836/12

(51) Int. Cl.
*B65G 59/06* (2006.01)
*B65G 57/03* (2006.01)

(52) U.S. Cl.
CPC ............ *B65G 59/062* (2013.01); *B65G 57/03* (2013.01); *B65G 2201/022* (2013.01); *B65G 2814/0305* (2013.01); *B65G 2814/0308* (2013.01)

(58) Field of Classification Search
CPC ............ B65G 59/062; B65G 2201/022; B65G 2814/0305; B65G 2814/0308;
(Continued)

(56) References Cited

U.S. PATENT DOCUMENTS 2,695,125 A * 11/1954 Bowen ...................... B67B 3/00
                                                              198/444
3,353,822 A    11/1967 Dangelmaier et al.
(Continued)

FOREIGN PATENT DOCUMENTS

DE     3150045 A1    6/1983
DE    10154235 A1    5/2003
(Continued)

OTHER PUBLICATIONS

International search report for PCT/CH2013/000205 dated May 15, 2014.

*Primary Examiner* — Lynn E Schwenning
(74) *Attorney, Agent, or Firm* — McCormick, Paulding & Huber LLP

(57) ABSTRACT

In a destacking device comprising a stacking magazine (2), the respective lowest sheet of a stack (1) of metal sheets is destacked by way of a suction element (5, 15). This element can be moved upward and downward by way of a drive (6). At the end of the upward movement, the respective lowest metal sheet (4) of the stack (1) is gripped by suction power and pulled from the stack. A second suction element (5', 15') is provided, which can be moved upward and downward by way of a drive (6') and by way of which the lowest sheet (4) of the stack (1) can be gripped at the end of the upward movement. The second suction element is driven so as to be leading with respect to the first suction element, so that the respective lowest sheet (4) of the stack (1) can first be pulled from the stack by the second suction element (5'), and subsequently by the first suction element (5). In this way, it becomes possible to destack thin sheets having a thickness of only 0.12 mm and a square shape without disruption. The stack is held magnetically in the stacking magazine, which facilitates destacking.

14 Claims, 5 Drawing Sheets

(58) Field of Classification Search
CPC .......... B21D 43/22; B21D 43/24; B65H 1/06; B65H 1/30; B65H 3/085; B65H 3/0883; B65H 3/34; B65H 3/48
USPC ................................ 414/795.4, 795.7, 798.1
See application file for complete search history.

(56) References Cited

U.S. PATENT DOCUMENTS

| | | | | |
|---|---|---|---|---|
| 4,255,073 | A * | 3/1981 | Schottle | B41J 3/387 271/267 |
| 4,623,057 | A * | 11/1986 | Langenberg | B65G 57/04 198/381 |
| 4,815,916 | A * | 3/1989 | Beck | B65G 59/04 271/154 |
| 5,841,094 | A * | 11/1998 | Baumgartner | B23K 11/063 219/110 |
| 6,468,025 | B1 * | 10/2002 | Stumpf | B21D 43/24 271/18.1 |
| 7,726,166 | B2 * | 6/2010 | Kong | B21D 43/05 414/795.8 |
| 2008/0226438 | A1 * | 9/2008 | Fischereder | B21D 5/0281 414/795.7 |
| 2010/0228388 | A1 * | 9/2010 | Ago | B65G 47/917 700/228 |
| 2010/0272542 | A1 * | 10/2010 | Mueller | B23K 11/063 413/1 |

FOREIGN PATENT DOCUMENTS

| | | |
|---|---|---|
| DE | 102005008418 A1 | 8/2006 |
| EP | 0574745 A1 | 12/1993 |
| EP | 1238929 A2 | 9/2002 |
| EP | 1914169 A1 | 4/2008 |
| EP | 1995195 A2 | 11/2008 |
| WO | 2012119915 A1 | 9/2012 |
| WO | WO-2012119915 A1 * | 9/2012 ............. B21D 43/24 |

* cited by examiner

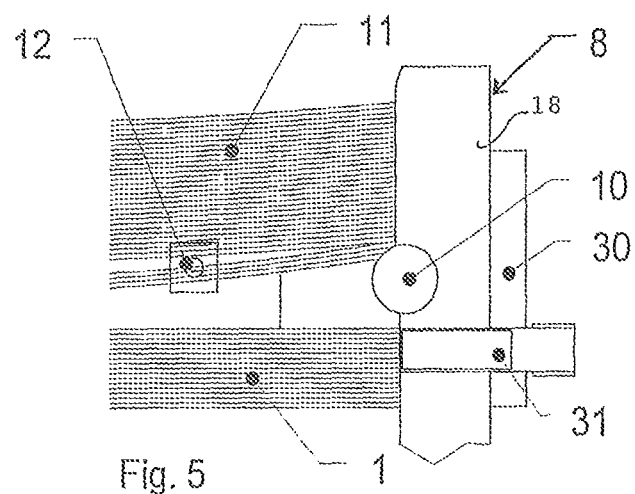
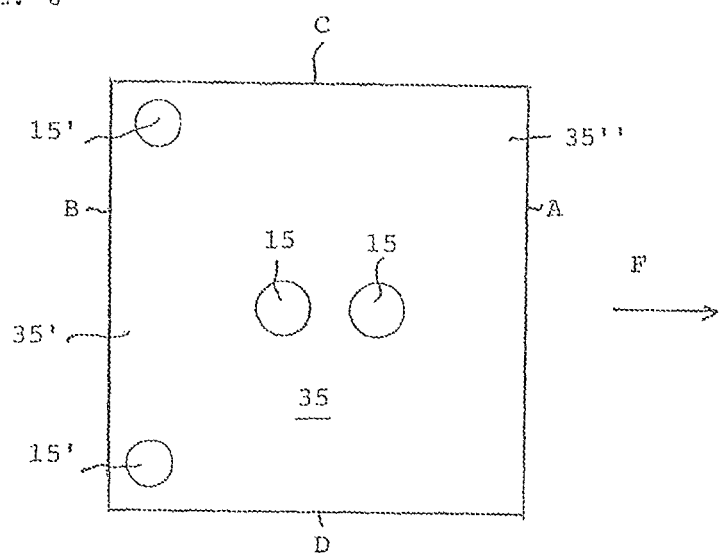

DESTACKING DEVICE AND METHOD FOR DESTACKING METAL SHEETS

CROSS REFERENCES TO RELATED APPLICATIONS

This application claims the priority of Swiss patent application No. 2836/12, filed Dec. 17, 2012, the disclosure of which is incorporated herein by reference in its entirety. The application is also a nationalization of PCT Application Number PCT/CH2013/000205 filed Nov. 29, 2013 which is incorporated herein by reference in its entirety.

FIELD OF THE INVENTION

The invention relates to a destacking device, comprising a stacking magazine that is open on the bottom side and a pull-off device that is disposed beneath the stacking magazine and has a drivably upward and downward movable suction element, which, in the reversal position thereof from the upward movement to the downward movement, is positioned within the lower opening of the stacking magazine, for gripping the respective lowest sheet by way of negative pressure and pulling the gripped sheet from the stack. The invention further relates to a refilling device for a stacking magazine. Moreover, the invention relates to a system comprising a destacking device, a rounding device and a welding machine, and to a method for producing can bodies.

BACKGROUND OF THE INVENTION

The invention is in the field of manufacturing container bodies, and in particular can bodies made of sheet steel. During the production thereof, individual sheets are destacked from a stack and fed to a rounding device, and subsequently to a welding machine for welding the longitudinal seam of the container or of the can. This is known to the person skilled in the art. The stack composed of individual sheets located on top of one another, which comprises approximately 200 to 1000 sheets, for example, is located in a stacking magazine and is seated there on laterally provided support rails and support detents, so that the weight of the stack acts on the lowest sheet. According to the prior art, the lowest sheet is contacted by a drivably upward and downward moving suction head having multiple suction cups in the upper position of the suction head and is attracted to the head using negative pressure. During the downward movement of the suction head, the attracted sheet is pulled away downward and out of the support rails and support detents. As the sheet is removed, air must flow into the region between the lowest sheet to be extracted and the remaining sheet stack so as to compensate for the negative pressure between the lowest and the second lowest sheets which develops during removal. Otherwise multiple sheets are destacked simultaneously, which results in undesirable disruptions and in production downtime and material losses. So as to support the separation of the lowest sheet from the remaining sheet stack, separating air is blown in via air nozzles provided laterally in the stacking magazine. The air film thus formed between the lowest few sheets assures that ambient air flows in and separates the lowest sheet from the second lowest sheet during extraction. If high production speeds are to be achieved, separating air during destacking is indispensable. A high production speed is considered to be a range of 200 sheets per minute to 1200 sheets per minute. Typically, processes operate at 600 sheets per minute.

It has been shown that destacking becomes problematic in the above-described conventional manner with thin sheets (which is considered to include metal sheets having a thickness of less than 0.14 mm), and in particular with square sheet formats, in which the path for air to flow in from all sides is long. The separating air is poorly suited for thin sheets since these metal sheets are not sufficiently stable and may fall downward out of the stacking magazine as a result of the use of the separating air.

SUMMARY OF THE INVENTION

It is the object of the invention to create a destacking device which does not exhibit the above-described disadvantages. This destacking device is thus to be suited especially for thin sheets, and in particular for square or approximately square thin sheets. The destacking device in particular is to allow the destacking of thin sheets (metal sheets having a thickness of less than 0.14 mm) and at a high rate (more than 200 sheets per minute).

This object is achieved in a destacking device of the type mentioned above in that the pull-off device comprises an additional suction element movable by a drive upward and downward, which is driven so as to be leading with respect to the first suction element.

Because of the leading additional suction element, the respective lowest sheet can already be partially detached from the stack by this additional suction element, so that ambient air can flow into the region between the first and second metal sheets of the stack. As a result, the lagging suction element, which carries out the actual destacking of the lowest metal sheet, can pull this sheet off without the risk of the second lowest sheet likewise being pulled off. The additional suction element thus helps destacking by the suction element without doing a full destacking function by itself.

The additional suction element is preferably disposed so as to be positioned in the edge region of the lower opening of the stacking magazine when the element is in the reversal position, and can thus engage on one side of the lowest sheet, which facilitates the inflow of ambient air. It is preferred in particular for the second suction element to comprise at least one suction cup, which is positioned in one corner of the edge region, and in particular for the second suction element to comprise two suction cups, which are each positioned in a corner of the edge region. In this way, the respective lowest metal sheet can be detached from the stack by the leading suction element at one corner, or at two corners, which further enhances the inflow of ambient air between the lowest and second lowest sheets.

The object is further achieved in a destacking device in that the holding means comprise magnets, which are disposed on at least two opposing sides of the stacking magazine.

The lateral magnetic holding means hold a sheet metal stack and facilitate the destacking of thin sheets. Because no mechanical holding means must engage on the bottom side of the stack on the sides of the stacking magazine on which the lateral magnetic holding means are provided, pulling off by the suction element is facilitated, and separating air can be dispensed with. In this way, even thin sheets can be destacked at a high rate and without disruptions. The magnetic holding means hold the stack at least partially along the height thereof and thus relieve the lowest sheet of the weight of the stack, which facilitates the destacking of the lowest metal sheet. The magnetic holding means can be combined with destacking using a suction element according to prior art. They are preferably combined with a pull-off device having additional leading suction element.

Magnetic holding means are preferably disposed on all four sides of the receptacle of the destacking device. In the preferred embodiment, the holding means are exclusively magnetic holding means, so that the stack can be held in the receptacle strictly magnetically. In this way, mechanical holding means in the form of the conventional support rails and support detents can be entirely dispensed with. This facilitates the destacking of thin sheets and prevents damage to the metal sheets, which may occur when the sheets must jump over the conventional support detents during destacking.

It is further preferred for the magnetic holding means to be formed by rod-shaped permanent magnets, the longitudinal axis of which is disposed vertically, wherein the permanent magnets are preferably disposed over the entire height of the receptacle and thus hold the stack over the entire initial height thereof.

The object is further achieved by a first method of destacking individual metal sheets from the bottom side of a sheet stack by gripping the respective lowest sheet by way of a negative pressure suction element, which pulls the gripped metal sheet from the stack and deposits the same on a placement area, characterized in that the respective lowest sheet is partially detached from the stack by an additional suction element before being pulled off by the suction element. Alternatively, the object is achieved by a second method of destacking individual metal sheets from the bottom side of a sheet stack by gripping the respective lowest sheet by way of a negative pressure suction element, which pulls the gripped sheet from the stack and deposits the same on a placement area, the stack being held by holding means in a stacking magazine that is open on the bottom side, characterized in that the stack is held by magnetic holding means in the stacking magazine. It is preferable for this purpose to use both aspects, so that the solution is preferably achieved by the first method in combination with the second method.

The invention is further intended to achieve the object of introducing metal sheets into a stacking magazine.

This object is achieved by a refilling device on a stacking magazine, comprising a refilling magazine which is disposed above the stacking magazine and has a rotatably drivable shaft on each of two sides of the refilling magazine, the shafts together forming a support for a stack, and at least one controllably activatable air nozzle, by way of which air can be blown into the refilling magazine in such a way that metal sheets on the bottom side of the stack can be bent by the air supply in the direction of the stacking magazine.

The above-described advantages when producing cans are achieved by a system comprising a destacking device and a rounding device and welding machine.

BRIEF DESCRIPTION OF THE DRAWINGS

Further embodiments, advantages and applications of the devices and the methods will be apparent from the dependent claims and the following description of exemplary embodiments based on the figures. In the drawings:

FIG. 5 shows a detailed view of the refilling device; and

FIG. 6 shows a top view from above onto the opening of the stacking magazine or the receptacle for the metal sheet stack.

DESCRIPTION OF THE PREFERRED EMBODIMENTS

Figure 1:
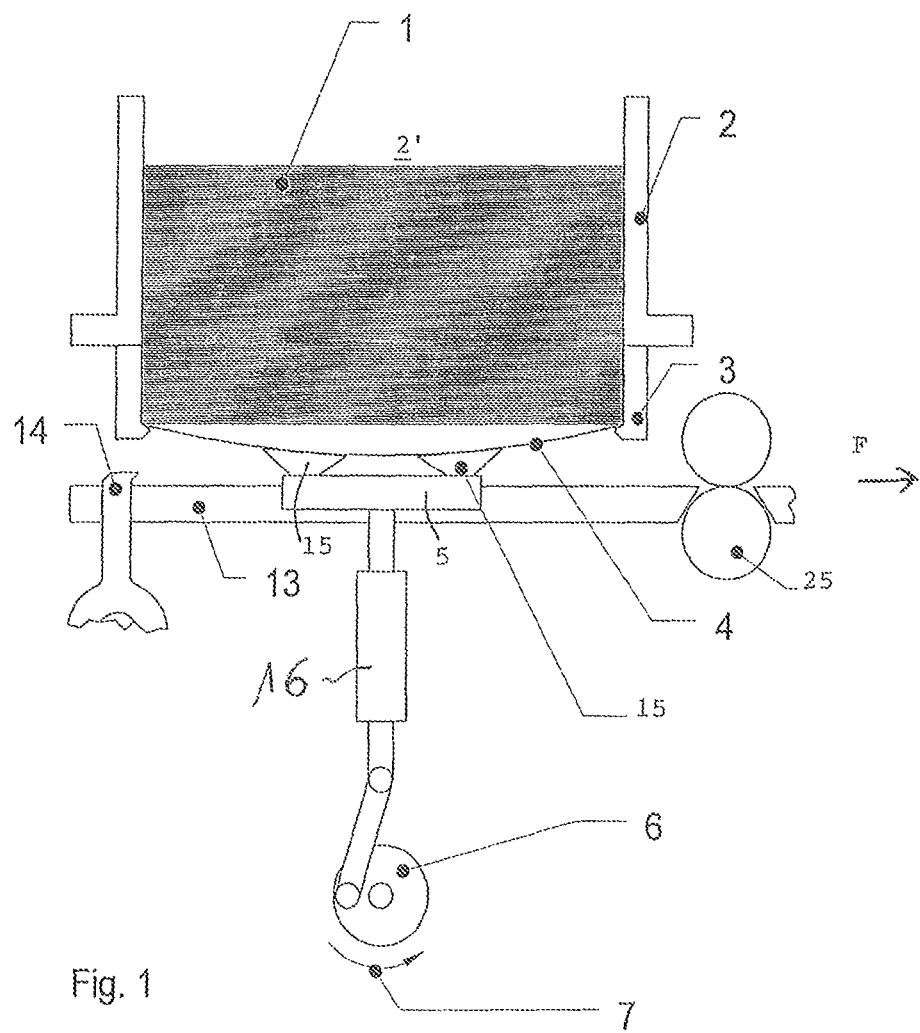
FIG. 1 shows a schematic vertical sectional view of a destacking device according to prior art.

FIG. 1 shows a schematic view of a vertical section through a destacking device according to the prior art. The stack 1 composed of the individual metal sheets situated on top of each other is located in a stacking magazine 2, the bottom side of which is open and the boundaries of which form a cavity or a receptacle 2' for the sheet metal stack 1. At the lower end of the receptacle 2', the sheet metal stack 1 is seated against lateral support rails 3 on the lower opening of the stacking magazine. Support rails or so-called support detents can likewise be provided on the other two sides of the receptacle, which is known to the person skilled in the art. The lowest metal sheet 4 is contacted by a drivably upward and downward moving suction head 5 having multiple suction cups in the uppermost position of the suction head and is attracted to the suction head using negative pressure. The suction head is connected to a negative pressure source for this purpose, and the negative pressure on the suction cups can be activated (attracting the metal sheet) and deactivated (releasing the metal sheet) by at least one controlled valve 16. The drive is shown schematically with the motor-driven wheel 6, on which a lever is eccentrically disposed, which is connected to a support rod of the suction head. The direction of rotation of the wheel 6 is indicated by the arrow 7. During the downward movement of the suction head—which is shown in FIG. 1—the attracted metal sheet 4 is pulled away downward out of the support rails and support detents. As the sheet is removed, air must flow into the region between the lowest sheet to be extracted and the remaining sheet stack so as to compensate for the negative pressure between the lowest and the second lowest sheets which develops during removal. Otherwise multiple sheets are destacked simultaneously, which results in undesirable disruptions and in production downtime and material losses. So as to support the separation of the lowest sheet from the remaining sheet stack, separating air is blown in via air nozzles (not shown) provided laterally in the stacking magazine. The air film thus formed between the lower sheets of the stack assures ambient air flows in and separates the lowest sheet from the second lowest sheet during extraction. The sheet is deposited onto a rail-like placement area 13 and released by the suction cups. This is known to a person skilled in the art, as is the subsequent insertion of the metal sheet between conveying rollers 25 by way of an insertion finger 14, so that the sheet is transported in the direction F. The metal sheet then arrives in the rounding device, and from there in the welding device for the longitudinal seam of the container body.

Figure 2:
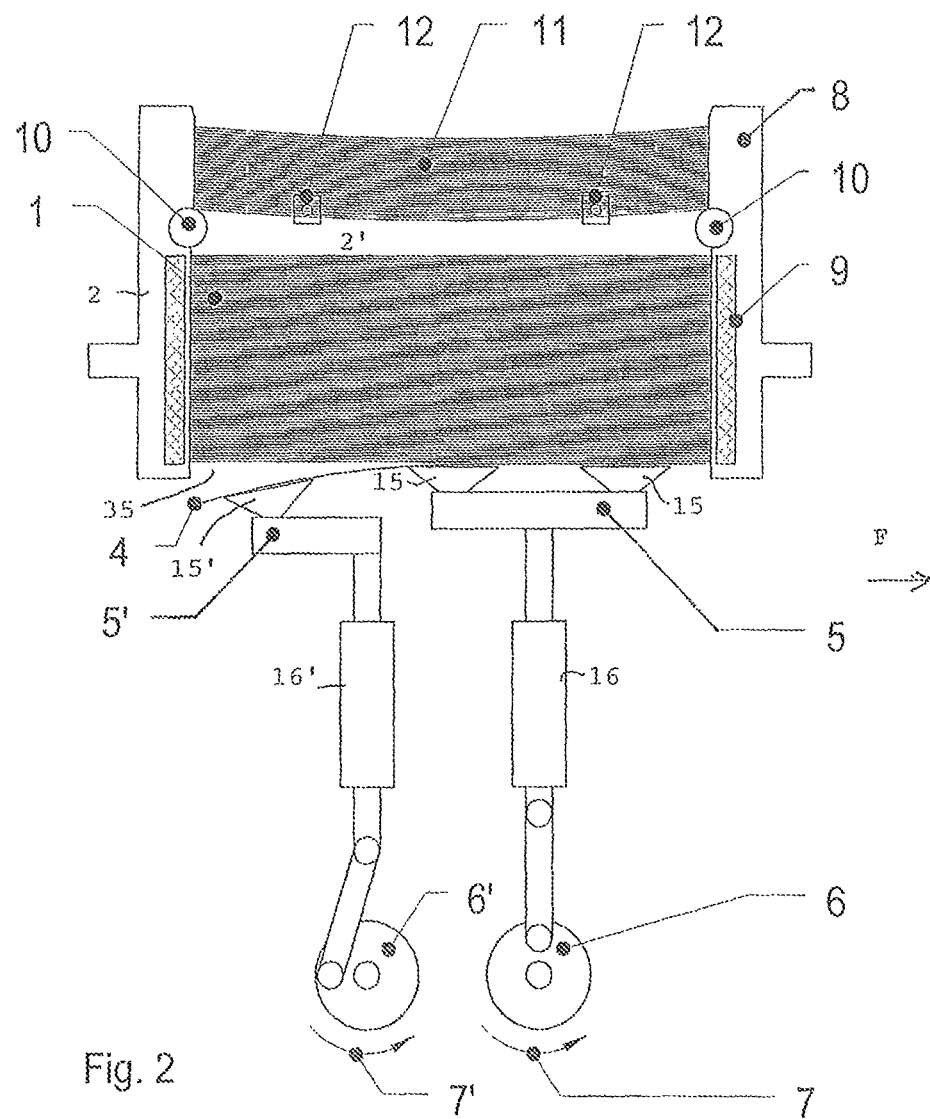
FIG. 2 shows the same view as in FIG. 1 of a destacking device according to one exemplary embodiment of the invention.
Figure 4:
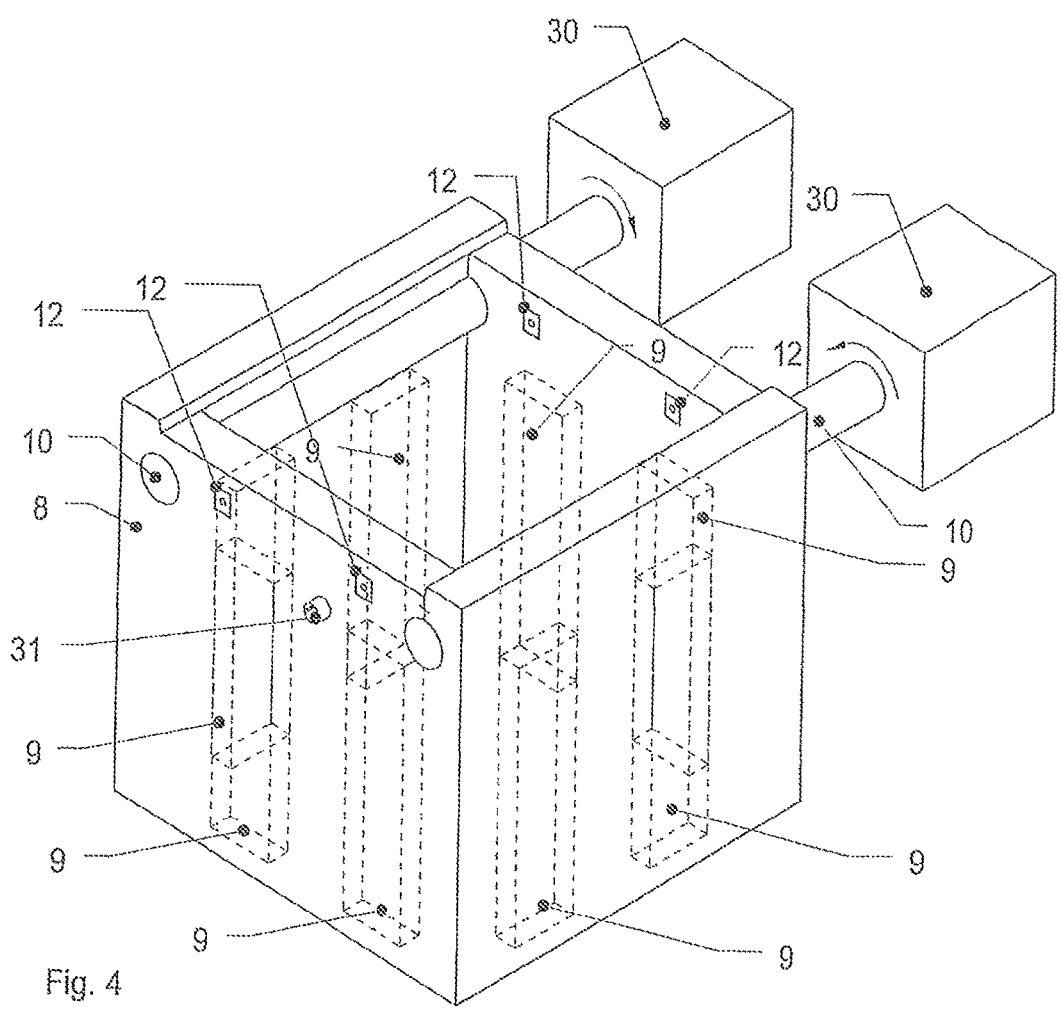
FIG. 4 shows an illustration of a stacking magazine with a refilling device.

FIG. 2 shows, likewise in a schematic vertical sectional view, a preferred embodiment of the destacking device according to the invention, and FIG. 4 shows an illustration of the stacking magazine comprising the holding means for the stack according to this preferred embodiment. A refilling device 8 for controlled stack replenishment is illustrated above the destacking device, the refilling device being described further below. This refilling device may be provided in combination with the destacking device according to the invention, or also on a destacking device according to the prior art.

The description of the invention below employs the terms 'bottom' and 'top', and these are intended as is apparent from the drawings for the horizontally located stack 1, which has a top side and a bottom side. The use of 'back' refers to the left side in FIGS. 1 and 2, or the side on which the insertion finger 14 for the destacked sheet acts. Accordingly, 'front' is used when the right side in FIGS. 1 and 2 is referred to, or the side on which the destacked sheet enters the draw-in rollers 25.

The preferred destacking device according to FIG. 2 and FIG. 4 has a stacking magazine 2 that is open toward the bottom (opening 35) and has a receptacle 2' for receiving a stack 1. This stack is composed of a plurality of individual sheets and comprises approximately 200 to 1000 metal sheets, for example. The inner lateral walls (which can be individual wall portions only or lateral walls having interruptions) of the stacking magazine form the boundary of the cavity or of the receptacle 2' for the stack. The outline of the receptacle 2' is adapted to the shape and size of the metal sheets and is thus square or rectangular. The size of the outline of the receptacle 2' is dimensioned such that the receptacle is only slightly larger than the base area of the stack, for example it is larger in the range of just a few tenths of a millimeter. The stack thus has only slight play in the receptacle. The metal sheets are steel sheets, as they are used for producing containers, and in particular for producing cans.

Magnetic holding means 9 are used as holding means for the metal sheets. In a preferred variant, magnetic holding means are exclusively provided, so that the support rails 3 (FIG. 1) according to the prior art are dispensed with and support detents are also dispensed with. However, it would also be possible to provide a combination of magnetic holding means with mechanical supports. In the preferred embodiment shown, only the magnetic holding means 9 are provided. Magnetic holding means are preferably present on all four sides of the receptacle 2', or on all four sides of the stacking magazine 2, so that the stack is held by magnetic holding means from all sides. This is apparent from FIG. 4, in which the holding means 9 are shown with interrupted lines. Preferably only isolated regions of the sides of the stacking magazine 2 are provided with magnetic holding means 9. The magnetic holding means 9 preferably extend vertically over the entire height of a full stack, as is shown in FIG. 2. For example, rod-shaped permanent magnets, the longitudinal axis of which is oriented vertically, are provided as magnetic holding means. It is possible to provide two such magnetic rods on each side of the stacking magazine, for example, as is shown in FIG. 4. The stack 1 is thus held in the stacking magazine 2 preferably exclusively by the magnetic forces acting on the metal sheets. It is also possible to use solenoids or a combination of solenoids and permanent magnets.

As in the embodiment of FIG. 1, destacking takes place from beneath, or the lowest metal sheet is attracted by suction cups and deposited on the placement area 13, however this area is not shown again in FIG. 2. Reference is made to the description of FIG. 1 in this regard as well as regarding the elements 14 and 25.

Different suction cups are provided, which do not contact and grip the lowest metal sheet simultaneously and thus do not detach the sheet from, or pull the sheet from, the stack simultaneously.

FIG. 2 shows one embodiment, in which the known suction head 5, which has already been described in connection with FIG. 1, having multiple suction cups 15 forms a first suction element, and is shown with the drive 6 thereof having the direction of rotation 7. An additional or second suction head having one, or likewise multiple suction cups 15' is denoted by numeral 5' and forms a further suction element and comprises a drive 6' having a direction of rotation 7'. The second suction head 5' is referred to hereafter as the pilot suction head because it leads as compared to the suction head 5 and thus contacts and grips the lowest metal sheet 4 before the suction head 5 does, and has already detached or partially pulled the sheet from the stack 1 when the suction head 5 contacts and grips the sheet 4, as is shown in FIG. 2 by the back edge region of the sheet 4, which has already been detached from the stack, while the first suction element or the suction head 5 has just reached the uppermost position thereof and contacts the lowest sheet and grips the same using negative pressure.

It is preferred for the pilot suction cup to act in an edge region of the lowest sheet 4, or in an edge region of the receptacle 2', or the lower opening 35 of the stacking magazine. The additional or pilot suction cup, respectively, preferably acts on the back edge region of the metal sheet 4, or of the receptacle 2', as is shown in FIG. 2. It is further preferred for the pilot suction cup to comprise two suction cups, which each engage in a corner of the metal sheet or of the receptacle 2'. The suction head 5' thus comprises at least two suction cups in the preferred embodiment, of which each engages in a corner at the back of the metal sheet 4. The suction head 5 can further engage approximately at the center of the metal sheet 4, as is shown in FIG. 1, however it may be disposed shifted forward from the center, as is shown in FIG. 2. FIG. 6 is a schematic illustration of a view from above onto the receptacle 2' for the stack, so that the outlines of the opening 35 or of the receptacle 2' and also of the sheet metal stack are apparent. A square outline has been selected for this example. The sides of the opening 35 or of the stacking magazine 2 or of the receptacle 2' thereof are denoted by reference signs A to D, and what has been described above is illustrated. The suction cups 15 of the first suction element can be disposed in the customary manner and thus grip the lowest metal sheet approximately at the center or at most slightly eccentrically. The suction cups 15' of the leading suction element are preferably disposed at the edges (edge regions 35' or 35"), in the present example in the edge region 35' close to the side B, and particularly preferably in two corners of the opening, and thus grip the lowest sheet in these corners.

The additional suction head 5' is driven so as to be leading. In FIG. 2, the lead is approximately 90 degrees out-of-phase with the first suction head, or in other words, when the first suction head 5 arrives at the top reversal point, at which it contacts and attracts the metal sheet 4 and thus grips the same, the additional suction head 5' has already covered an angle of rotation 20 of the driving wheel 6' of 90 degrees starting from the top reversal point. The back region of the metal sheet 4 has thus already been detached from the stack 1. Ambient air can then flow between the metal sheet 4 and the sheet of the stack located thereabove, and the suction head 5, or the first suction element, can safely pull off the lowest sheet. The step of actively blowing in separating air in the lower region of the stack can thus be eliminated. A value of approximately 90 degrees for the lead is preferred, in particular for the thin sheets mentioned at the outset, however the described effect also occurs at lower or higher values for the lead. The pilot suction cup could also engage at the front of the metal sheet, and the suction head 5 would then be disposed centrally or shifted toward the back. The pilot suction cup 5' can release the metal sheet 4 when the suction head 5 retains the sheet and moves it toward the placement area 13.

Figure 3:
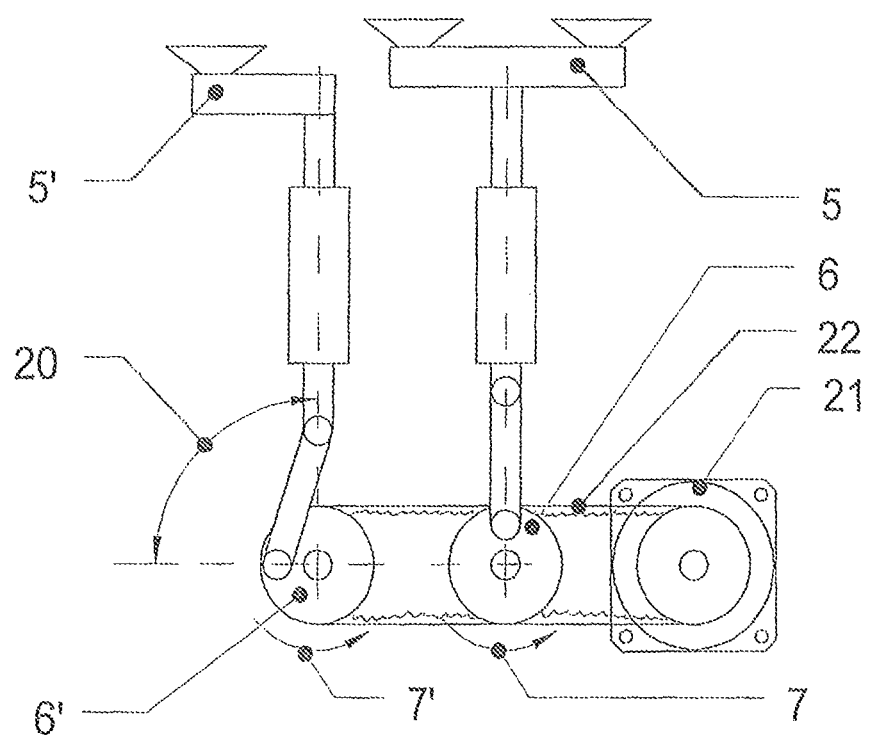
FIG. 3 shows how two suction cups operating out-of-phase are driven by way of a common driving motor.

FIG. 3 shows an example of how the drive of the additional suction head 5', the angle of rotation of which is shifted or is out-of-phase by approximately 90 degrees, respectively, may be implemented. A shared motor 21 drives the driving wheel 6 for the suction head 5 and the driving wheel 6' for the suction head 5' by way of the toothed belt 22. The motor can be an electric motor (servo motor or stepper motor, or another driving motor that is known to the person skilled in the art.

The lines for air from the suction heads 5, 5', or from the suction elements, to the controllable valves 16 and 16', and from there to the negative pressure source, as well as the control of the air pressure for gripping and releasing the metal sheet by the suction cups 15, 15' are not shown and will not be described in detail because these are known to a person skilled in the art.

The method according to the invention allows disruption-free destacking, even in the case of thin sheets, which refers to ferromagnetic sheets having a thickness of approximately 0.14 mm to 0.10 mm, and typically sheets having a thickness of 0.12 mm. This also applies to the square form of such metal sheets and large formats, which includes formats of more than approximately 150×150 mm up to approximately 320×320 mm. This applies to high pull-off rates of approximately 200 sheets per minute up to approximately 1200 sheets per minute.

The method that is preferred is the one using the pilot suction cup, which separates the metal sheet at two corners from the stack chronologically before the suction head, in combination with the magnetic stack holder, which allows extraction of the sheet with leading edges particularly well. Further advantages of the invention from the combination of the two aspects are a lower compressed air consumption by eliminating the blowing of separating air into the stack, and the prevention of injuries by the metal sheet edges, because the mechanical supports for the stack are dispensed with.

A further aspect of the invention will be described based on FIGS. 4 and 5. A refilling device is present above a stacking magazine 2, the device dispensing metal sheets from a second stack above the stacking magazine into the receptacle of the stacking magazine. FIG. 5 shows a detailed view, in which a stacking magazine 2 is partially illustrated. This may be a stacking magazine where the stack is held magnetically, as was described above, or a stacking magazine according to the prior art, for example according to FIG. 1, in which the stack is held by way of support rails and support detents. The refilling device 8 comprises a frame 18, or a frame-like structure, in which the second metal sheet stack 11 is disposed above the stacking magazine. In FIG. 4, this frame is designed as an upward extension of the stacking magazine 2. However, the frame, or the frame-like structure, can also be a component that is separate from the stacking magazine. The second metal sheet stack 11 is seated on two rotatably drivable shafts 10, which are mounted on the frame opposite from each other. So as to replenish the stack 1 in the stacking magazine 2 with metal sheets from the second sheet stack 11, the shafts are rotated by a driving means, so that the sheets of the second sheet stack 11 which are seated on the shafts can fall downward into the stacking magazine 2 as long as the rotation takes place. FIG. 4 shows two drive motors 30, and the directions of rotation of the shafts are indicated by arrows at the motors. So as to support the process, compressed air is additionally blown into the lowest metal sheets of the second sheet stack 11 during the replenishing process, which is illustrated by the air nozzle 12 in FIG. 5. The compressed air causes spacing of the lowest metal sheets, whereby the same become curved and slide more quickly out of the support shafts. The replenishing of the stacking magazine 2 with metal sheets from the second sheet stack 11 in the refilling device 8 can be carried out in a time-controlled manner, or by using a counter, which counts the sheets that were destacked from the stacking magazine 2 and thus detects the need for replenishment. The refilling device is preferably controlled by way of a fill level sensor 31 in the lower stacking magazine 2 which can detect a low fill level and send a message to a control unit of the destacking device, or of the entire system comprising the destacker and rounding device and welding machine, the control unit then activating the refilling device. For example, the sensor 31 can operate optically (light barrier) or electrically (such as inductively).

The invention claimed is:

1. A destacking device, comprising a stacking magazine that is open on the bottom side and has holding means for a stack of metal sheets, and a pull-off device that is disposed beneath the stacking magazine and has a first suction element, which is driven in upward and downward movement, and in a reversal position thereof from the upward movement to the downward movement is positioned within the lower opening of the stacking magazine for gripping the respective lowest sheet of a stack of sheets by way of negative pressure and pulling the gripped sheet from the stack, characterized in that the pull-off device comprises an additional suction element which is driven in upward and downward movement so as to be leading in movement with respect to the first suction element, the lower opening of the stacking magazine is unobstructed by physical supports, and the holding means is implemented exclusively with magnets so that the stack can be held in the stacking magazine strictly magnetically, and the magnets are disposed on at least two opposing sides of the stacking magazine.

2. A destacking device, comprising a stacking magazine that is open on the bottom side and has holding means for a stack of metal sheets, and a pull-off device that is disposed beneath the stacking magazine and has a first suction element which is driven in upward and downward movement, and in a reversal position thereof from the upward movement to the downward movement is positioned within the lower opening of the stacking magazine for gripping the respective lowest sheet of a stack of sheets by way of negative pressure and pulling the gripped sheet from the stack, characterized in that the pull-off device comprises an additional suction element, which is driven in upward and downward movement so as to be leading in movement with respect to the first suction element, and the holding means is implemented exclusively by magnets disposed on at least two opposing sides of the stacking magazine, so that the stack can be held in the stacking magazine strictly magnetically.

3. The destacking device according to claim 2, characterized in that the additional suction element is disposed such that it is positioned in the edge region of the lower opening of the stacking magazine when being in the reversal position of the element.

4. The destacking device according to claim 2, characterized in that the additional suction element comprises at least one suction cup, which is positioned in one corner of the edge region, or that the additional suction element comprises two suction cups, which are each positioned in a corner of the edge region.

5. The destacking device according to claim 2 characterized in that the additional suction element leads with a phase angle of approximately 90 degrees out-of-phase with a phase angle of the suction element.

6. The destacking device according to claim 2 characterized in that the holding means comprise magnets which are disposed on four sides of the stacking magazine.

7. A destacking device according to claim 2 characterized in that the holding means is formed by rod-shaped permanent magnets, the longitudinal axis of which is disposed vertically.

8. A system, comprising a destacking device according to claim 2, a rounding device, and a welding machine for producing can bodies.

9. A method for destacking individual metal sheets from the bottom side of a sheet stack by gripping the respective lowest sheet by way of a first negative pressure suction element, which pulls the gripped metal sheet from the stack and deposits the same on a placement area, the stack being held in a stacking magazine that has an opening on the bottom side and has holding means, characterized in that the respective lowest sheet is partially detached from the stack by an additional suction element before being pulled off by the first suction element, the opening at the bottom of the stacking magazine is unobstructed, and the stack is held in the stacking magazine exclusively by magnetic holding means in the form of magnets.

10. A method for destacking individual metal sheets from the bottom side of a sheet stack by gripping the respective lowest sheet by way of a first negative pressure suction element, which pulls the gripped metal sheet from the stack and deposits the same on a placement area, the stack being held in a stacking magazine that is open on the bottom side and has holding means, characterized in that the respective lowest sheet is partially detached from the stack by an additional suction element before being pulled off by the first suction element, and the stack is held in the stacking magazine exclusively by magnetic holding means in the form of magnets.

11. The method according to claim 10, characterized in that the second suction element grips the lowest metal sheet in an edge region of the lowest sheet, or that the second suction element grips the lowest sheet in at least one corner of the sheet or in two corners of the sheet.

12. The method according to claim 10, characterized in that the additional suction element is driven with a phase angle of approximately 90 degrees out-of-phase with a phase angle of the suction element.

13. The method according to claim 10 characterized in that the magnetic holding means acts on the stack from four sides of the stack.

14. A method for producing can bodies, in which metal sheets are destacked according to methods according to claim 10, fed to a rounding device, and subsequently are welded together at the longitudinal seam in a roll seam welding machine.

* * * * *